(12) United States Patent
Speckhart et al.

(10) Patent No.: US 7,511,449 B2
(45) Date of Patent: Mar. 31, 2009

(54) ELECTRIC MOTOR SYSTEM IMPLEMENTING VECTOR AND SLIP CONTROL

(75) Inventors: Gregory J. Speckhart, Peoria, IL (US); Mark Edward Hartman, Peoria, IL (US); Jackson Wai, Peoria, IL (US); Joshua Michael Williams, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 156 days.

(21) Appl. No.: 11/589,967

(22) Filed: Oct. 31, 2006

(65) Prior Publication Data

US 2008/0100257 A1 May 1, 2008

(51) Int. Cl.
*H02P 23/00* (2006.01)
(52) U.S. Cl. .................. 318/807; 318/803; 318/798
(58) Field of Classification Search .......... 318/807, 318/803, 798, 52, 801, 809, 805, 800, 812
See application file for complete search history.

(56) References Cited

U.S. PATENT DOCUMENTS

| | | | |
|---|---|---|---|
| 2,519,118 A | 8/1950 | Curtis et al. | |
| 4,499,414 A | 2/1985 | Fujioka et al. | |
| 4,677,360 A * | 6/1987 | Garces | 318/803 |
| 4,680,525 A | 7/1987 | Kobari et al. | |
| 5,032,771 A | 7/1991 | Kerkman et al. | |
| 5,811,956 A | 9/1998 | Yamamoto | |
| 5,821,727 A | 10/1998 | Yura | |
| 6,670,786 B2 | 12/2003 | Tobari et al. | |
| 6,879,130 B2 | 4/2005 | Iwashita et al. | |
| 2003/0020431 A1 * | 1/2003 | Kiuchi et al. | 318/779 |
| 2005/0253550 A1 | 11/2005 | Matsuo et al. | |

FOREIGN PATENT DOCUMENTS

| EP | 0 067 886 | 12/1982 |
|---|---|---|
| JP | 04304183 A | 10/1992 |

* cited by examiner

*Primary Examiner*—Karen Masih
(74) *Attorney, Agent, or Firm*—Finnegan, Henderson, Farabow, Garrett & Dunner

(57) ABSTRACT

A system is provided for controlling an electric machine. The system has a power source configured to supply electric energy to the electric machine. In addition, the system has an inverter operationally connected to the power source and the electric machine and configured to increase or decrease a rotor flux component of a voltage applied to the electric machine, while maintaining a torque component at an essentially constant level. The system further has a control device configured to determine at least one parameter of the electric machine and operate the inverter in either a first or a second mode in response to the at least one determined parameter.

18 Claims, 5 Drawing Sheets

ELECTRIC MOTOR SYSTEM IMPLEMENTING VECTOR AND SLIP CONTROL

TECHNICAL FIELD

The present disclosure is directed to an electric motor control system and method, and more particularly, to an electric motor control system and method employing vector and slip control strategies.

BACKGROUND

AC induction motors are widely used in automotive and industrial applications due, in large part, to their low cost, reliability, ruggedness, and simplicity. They typically consist of a stator and a rotor. The stator is a stationary member, and the rotor is a rotatable member positioned on a shaft within the stator. Coils are wound around both the stator and the rotor to form windings around each member. Applying an electric current to the stator windings produces a magnetic field that rotates at a frequency called the "synchronous frequency". The rotating magnetic field induces currents in the rotor windings, which in turn, produce another magnetic field.

The two magnetic fields interact by trying to align themselves with each other. This interaction produces a torque, which urges the rotor to rotate. A maximum torque is achieved when the fields are furthest from alignment, and a zero torque is achieved when the fields are aligned (i.e., when the rotor rotates at the synchronous frequency). The difference between the rotational frequency of the rotor and the synchronous frequency is called the "slip frequency" and sometimes acts as a factor used in algorithms to control the speed of the motor.

Induction motors are usually controlled by manipulating the current running through the stator. One widely used control strategy is vector control, which relies on a mathematical representation of the current having a torque component ($i_q$) and a rotor flux component ($i_d$). By applying a voltage to the current and modulating that voltage in response to feedback indicative of the torque and rotor flux components of the current, the speed and torque of the motor can be directly controlled.

Vector control strategy can effectively provide a quick response control of torque and speed, and increase the efficiency of the motor. However, because of its reliance on voltage modulation to control the current, vector control is relatively ineffective at high rotor speeds. At high rotor speeds, the current becomes less responsive to changes in the voltage, and the vector strategy loses control of current and torque. This can lead to overcurrent, overvoltage, undercurrent, oscillating torque, and generation of heat, all of which can damage the sensitive electronics of the controller and the motor.

U.S. Pat. No. 4,680,525 issued to Kobari et al. (Kobari) on Jul. 14, 1987, discloses a system and method that addresses the deficiencies of the vector control strategy at high rotor speeds. Kobari's system transitions from a vector control strategy to a slip control strategy when the rotor speed reaches a predetermined threshold. Unlike vector control, slip control does not modulate voltage to control the current in the stator. Instead, slip strategy controls the torque and speed of the motor by modulating the frequency of the current in response to the measured slip frequency of the motor. Once the rotor speed is below the threshold level, the system transitions back to a vector control strategy.

Although, utilizing a slip control strategy at high rotor speeds can compensate for some of the deficiencies of vector control, Kobari does not address the problems encountered during the transition between strategies. In particular, the same overcurrent, overvoltage, undercurrent, and heat generation problems experienced at high rotor speeds under vector control can often appear during the transition. In addition, an uncontrolled transition can lead to unpredictable torque and rotor speed. These problems can result in damage to the sensitive electronic equipment used in the motor control system and any apparatus being driven by the electric motor.

The present disclosure is directed towards overcoming one or more of the problems set forth above.

SUMMARY OF THE INVENTION

In one aspect, the present disclosure is directed toward a system for controlling an electric machine. The system includes a power source configured to supply electric energy to the electric machine. In addition, the system includes an inverter operationally connected to the power source and the electric machine and configured to increase or decrease a rotor flux component of a voltage applied to the electric machine while maintaining a torque component of the voltage at an essentially constant level. The system further includes a control device configured to determine at least one parameter of the electric machine and operate the inverter in either a first or second mode in response to the at least one determined parameter.

Consistent with a further aspect of the disclosure, a method is provided for controlling an electric machine. The method includes applying a voltage to a current passing through the electric machine and increasing a rotor flux component of the voltage while maintaining a torque component of the voltage at an essentially constant level.

DETAILED DESCRIPTION

Figure 1:
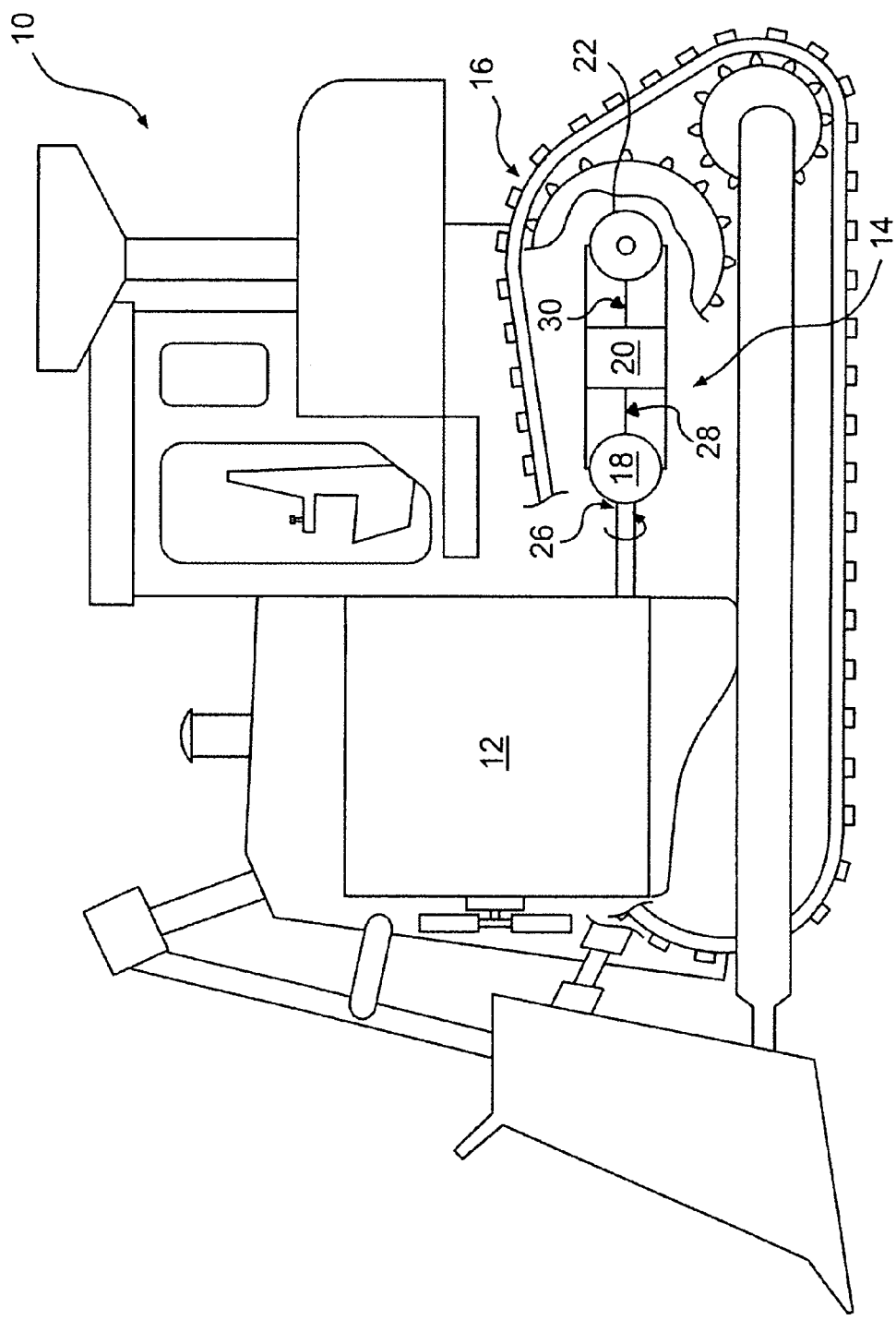
FIG. 1 is a pictorial illustration of a machine according to an exemplary disclosed embodiment.

FIG. 1 provides a diagrammatic perspective of a machine 10 according to an exemplary embodiment. It should be understood that while machine 10 is illustrated as a track type tractor, machine 10 may include any type of machine that includes one or more electric motors. For example, machine 10 may embody an on-highway vehicle, an off-highway vehicle, a wheel loader, an excavator, a skid steer, and other types of machinery. As illustrated in FIG. 1, machine 10 may include a power source 12 and an electric drive 14 connected to a traction device 16. Although traction device 16 is illustrated in FIG. 1 as a track, it is contemplated that traction device 16 may alternately include wheels or any other type of ground-engaging device, if desired.

Power source 12 may provide an output for powering various operations of machine 10. Furthermore, power source 12 may be an engine, such as a diesel engine, a gasoline engine, a gaseous fuel powered engine, or another appropriate type of engine. Alternately, it is contemplated that power source 12 may be any other type of power source such as, for example, a fuel cell, if desired.

Figure 2:
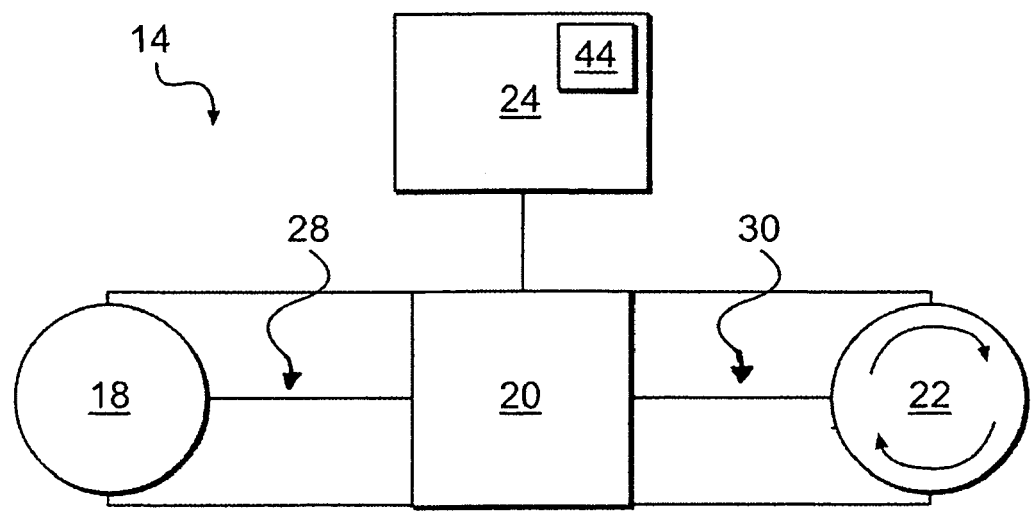
FIG. 2 is a block diagram of an electric drive, according to an exemplary disclosed embodiment.

As illustrated in FIG. 2, electric drive 14 may include a driving device 18 configured to produce an electrical output directed to an inverter 20, which may control a driven device 22 through the manipulation of the electrical output. Electric drive 14 may also include a controller 24 in communication with driving device 18, inverter 20, and driven device 22.

Driving device 18 may be a three-phase permanent magnet alternating field-type generator configured to produce a power output in response to a rotational input from power source 12. It is also contemplated that driving device 18 may be a switched reluctance generator or any other appropriate type of generator known in the art. Driving device 18 may include a rotor (not shown) rotatably connected to power source 12 by any means known in the art such as, for example, by a direct crankshaft connection 26, via a gear train, through a hydraulic circuit, or in any other appropriate manner. Driving device 18 may be configured to produce electrical power output as the rotor is rotated within a stator (not shown) by power source 12.

It should be understood that in addition to embodying a generator, driving device 18 may embody any type of available electrical power source suitable for whatever task may be performed by driven device 22. Such electrical power sources may include, for example, a battery assembly, a stationary electrical outlet, or any other source of electrical power known in the art. Driving device 18 may be operatively connected to inverter 20 through power line 28 or any other device that may transmit electric current. It should be understood that power line 28 may include any number of lines required to adequately transmit the electric current from inverter 20 to driven device 22.

Inverter 20 may include various components such as, for example, insulated gate bipolar transistors (IGBTs), microprocessors, capacitors, memory storage devices, and any other components that may be used for operating driven device 22. Other components that may be associated with inverter 20 include power supply circuitry (not referenced) and signal conditioning circuitry (not referenced), among others. Inverter 20 may manipulate and apply a voltage to a current generated by driving device 18, and further conduct the current to driven device 22 via power line 30. It should be understood that power line 30 may include any number of lines required to adequately transmit electric current from inverter 20 to driven device 22.

Figure 3:
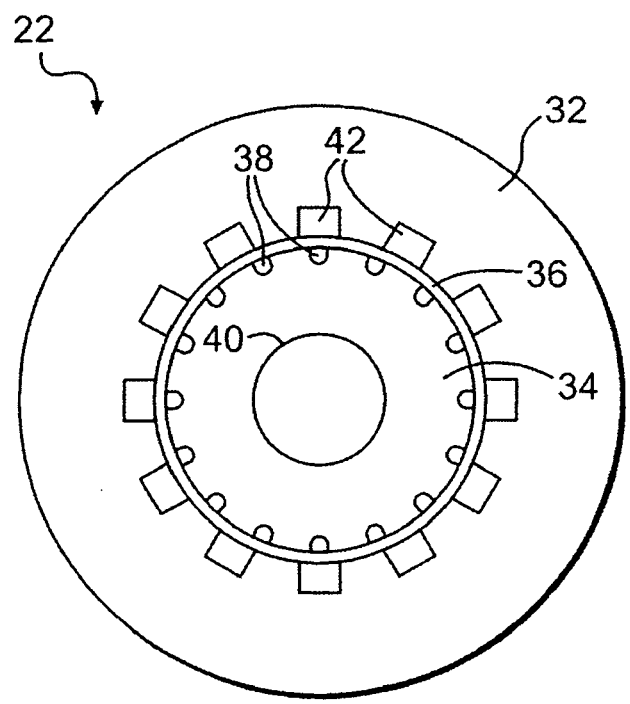
FIG. 3 is a diagrammatic representation of an electric motor, according to an exemplary disclosed embodiment.

FIG. 3 provides a diagrammatic illustration of driven device 22. In an exemplary embodiment, driven device 22 is a three-phase AC induction motor. As an induction type of motor, driven device 22 may include two main components: a stator 32 and a rotor 34 separated from one another by an air gap 36. Rotor 34 may be constructed of a number of conducting bars 38 in electrical contact with one another and running parallel to a shaft 40 of driven device 22. Stator 32 may include a pattern of stator conductors 42 arranged in windings. As alternating current is passed through stator conductors 42, a moving magnetic field may be formed near stator 32. This magnetic field may cause electric currents in the elements of rotor 34, which may cause rotor 34 to generate a magnetic field of its own. The interaction of these magnetic fields can produce a torque on rotor 34 and, therefore, on shaft 40, which may be coupled to rotor 34. By manipulating the frequency, voltage, and phase of the electric current passing through stator conductors 42, inverter 20 may control the speed and torque of driven device 22. It should be understood that although driven device 22 is shown being used with machine 10, driven device 22 may be used in any apparatus or system employing electric motors.

Controller 24 may take many forms, including, for example, a computer based system, a microprocessor based system, a microcontroller, or any other suitable control type circuit or system. Controller 24 may include various components for running software applications designed to control driven device 22. For example, controller 24 may include a central processing unit (CPU), a random access memory (RAM), input/output (I/O) elements, etc. In particular, controller 24 may include a control unit 44 dedicated to the manipulation of the electric current being supplied to driven device 22.

Figure 4:
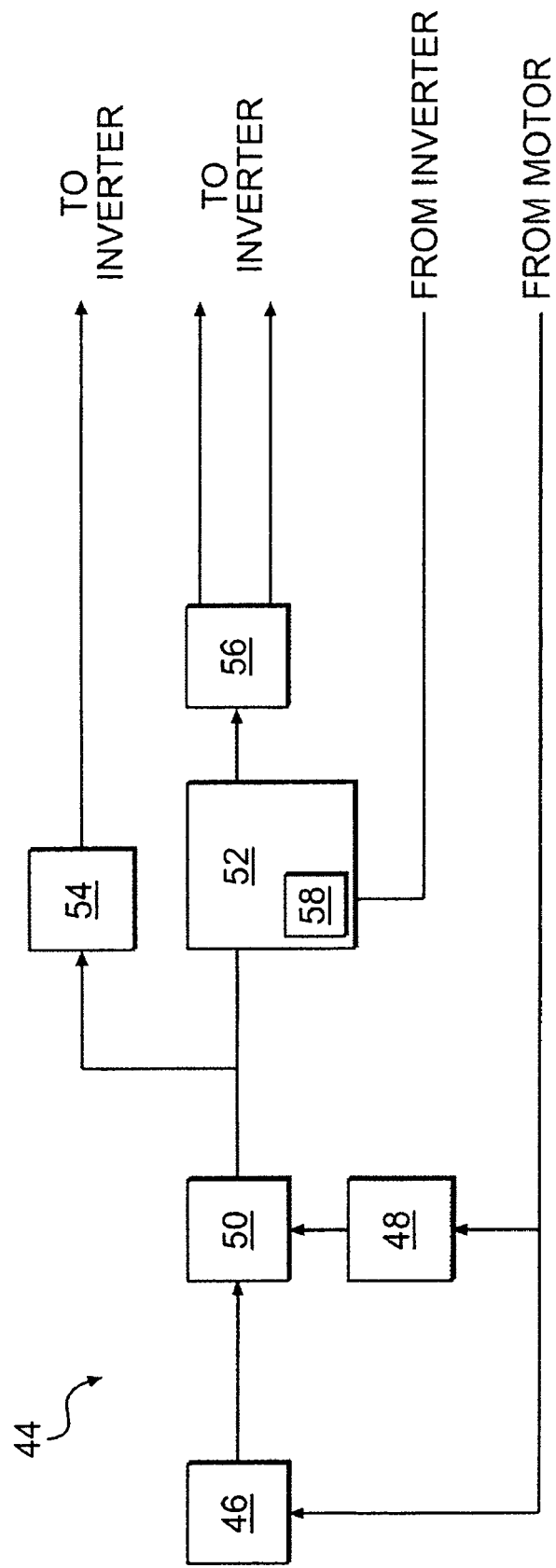
FIG. 4 is a block diagram of a control unit, according to an exemplary disclosed embodiment.

FIG. 4 illustrates an exemplary control unit 44. Control unit 44 may include various subsystems, which interact with each other to produce a desired rotor speed and torque. Such subsystems may include a torque controller 46 and flux controller 48 for interpreting data sensed by a sensor (not shown) located on driven device 22. Control unit 44 may also include a target current calculator 50, which may use the interpreted data to calculate a desired current. Control unit 44 may further include a vector controller 52 and a slip controller 54, which may set the voltage and frequency values to be applied to the current passing through stator conductors 42. Additionally, control unit 44 may include an inverter voltage controller 56 for transforming the vector and slip controller outputs into a form useful to inverter 20.

Torque controller 46 and flux controller 48 may determine the required motor torque and rotor flux necessary to maintain or reach a desired rotor speed. Torque controller 46 and flux controller 48 may make this determination in response to the actual rotor speed, which may be directly measured in any number of ways, such as, for example through speed sensors (not shown) located on rotor 34 or any location within driven device 22 that may facilitate detection of the rotor speed. By comparing the measured rotor speed with reference tables, graphs, and/or equations that may be included in the memory of controller 24, torque controller 46 and flux controller 48 may determine the rotor torque and rotor flux required to achieve the desired rotor speed.

Target current calculator 50 may use the rotor torque and rotor flux values determined by torque controller 46 and flux controller 48 to calculate the necessary current to be supplied to driven device 22, which may produce the desired rotor speed. When making the calculation, target current calculator 50 may utilize a mathematical representation that divides the current into a torque component ($I_q$) and a flux component ($I_d$). The component values may be calculated according to equations Eq. 1 and Eq. 2 below:

$$I_d = \frac{\lambda_r}{L_m} + \left(\frac{L_r}{L_m} \times \frac{1}{R_r} \frac{d}{dt}(\lambda_r)\right) \quad \text{Eq. 1}$$

$$I_q = \frac{T}{\lambda_r} \times \frac{1}{P} \times \frac{L_r}{L_m} \quad \text{Eq. 2}$$

where $L_r$ refers to the rotor inductance, $R_r$ refers to the rotor resistance, $L_m$ refers to the mutual inductance of the stator and the rotor, T refers to the rotor torque, $\lambda_r$ refers to the rotor flux, and P refers to the number of pole pairs in driven device 22.

It is contemplated that control unit 44 may operate in a vector control mode when the motor speed is below a predetermined threshold. In vector control mode, vector controller 52 and slip controller 54 may work together to determine the desired frequency and voltage to be applied to the current.

Vector controller 52 may determine a desired voltage based on the current component values calculated by target current calculator 50 and a measured current feedback. In an exemplary embodiment, vector controller 52 may include at least one non-linear PI controller 58. In addition, vector controller 52 may utilize a mathematical representation that divides the voltage into a torque component ($V_q$) and a flux component ($V_d$). The component values may be calculated according to equations Eq. 3 and Eq. 4 below:

$$V_d = V_{dPI} + V_{dff} \qquad \text{Eq. 3}$$

$$V_q = V_{qPI} + V_{qff} \qquad \text{Eq. 4}$$

where $V_d$ refers to the flux component of the output voltage, $V_q$ refers to the torque component of the output voltage, $V_{dPI}$ refers to the flux component of the PI control output, $V_{qPI}$ refers to the torque component of the PI control output, $V_{dff}$ refers to the flux component of the feed-forward output, and $V_{qff}$ refers to the torque component of the feed-forward output. The feed-forward calculations may be made according to equations Eq. 5 and Eq. 6 below:

$$V_d = -\left[\omega_e\left(L_s - \frac{L_m^2}{L_r}\right)I_q - (R_s)I_d\right] \qquad \text{Eq. 5}$$

$$V_q = \omega_e(L_s)I_d + (R_s)I_q \qquad \text{Eq. 6}$$

where $I_d$ refers to the target flux component of the current, $I_q$ refers to the target torque component of the current, $L_r$ refers to the rotor inductance, $R_r$ refers to the rotor resistance, $L_s$ refers to the inductance of the stator, $L_s$ refers to the mutual inductance of the stator and the rotor, and $\omega_e$ refers to the electrical frequency.

Slip controller 54 may determine a desired current frequency based on the current component values calculated by target current calculator 50 and measured rotor frequency. Slip controller 54 may calculate a slip frequency, which is the difference between the applied electrical frequency and the actual rotor frequency (rotor speed). Once calculated, the slip frequency may be used to determine the desired current frequency. Slip controller 54 may calculate the slip frequency and desired current frequency according to equations Eq. 7 and Eq. 8 below:

$$\omega_{slip} = (\omega_e - \omega_r) \qquad \text{Eq. 7}$$

$$\omega_{slip} = \left(\frac{L_m I_q}{\lambda_r}\right)\left(\frac{R_r}{L_r}\right) \qquad \text{Eq. 8}$$

where $\omega_{slip}$ refers to the slip frequency, $\omega_e$ refers to the applied electrical frequency, $\omega_r$ refers to the rotor electrical frequency, $I_q$ refers to the target torque component of the current, $L_r$ refers to the rotor inductance, $R_r$ refers to the rotor resistance, $L_s$ refers to the inductance of the stator, $L_s$ refers to the mutual inductance of the stator and the rotor, and $\omega_e$ refers to the electrical frequency.

It is contemplated that control unit 44 may operate in a slip control mode when the motor speed is above a predetermined threshold. In slip control mode, inverter 20 may control the rotor speed of driven device 22 by manipulating only the frequency of the current passing through stator conductors 42. Additionally, vector controller 52 may be deactivated, and slip controller 54 may determine the desired frequency by comparing the determined slip frequency to reference tables, graphs, and/or equations that may be included in the memory of controller 24.

Inverter voltage controller 56 may compare the voltage and frequency determined by vector controller 52 and slip controller 54 to reference tables, graphs, and/or equations that may be included in the memory of controller 24. From the comparison, inverter voltage controller 56 may send signals to inverter 20, which may cause inverter 20 to manipulate the voltage, frequency, and phase of the current to achieve the desired motor speed and torque.

INDUSTRIAL APPLICABILITY

The disclosed electric drive may provide a reliable control strategy for use throughout a motor's speed range by employing both vector and slip control strategies. In particular, by controlling the transition between vector and slip control, electric drive 18 may be able to reduce or eliminate erratic torque, erratic speed, overcurrent, undercurrent, overvoltage, undervoltage, and heat generation. The transition from vector control to slip control will now be explained.

Figure 5:
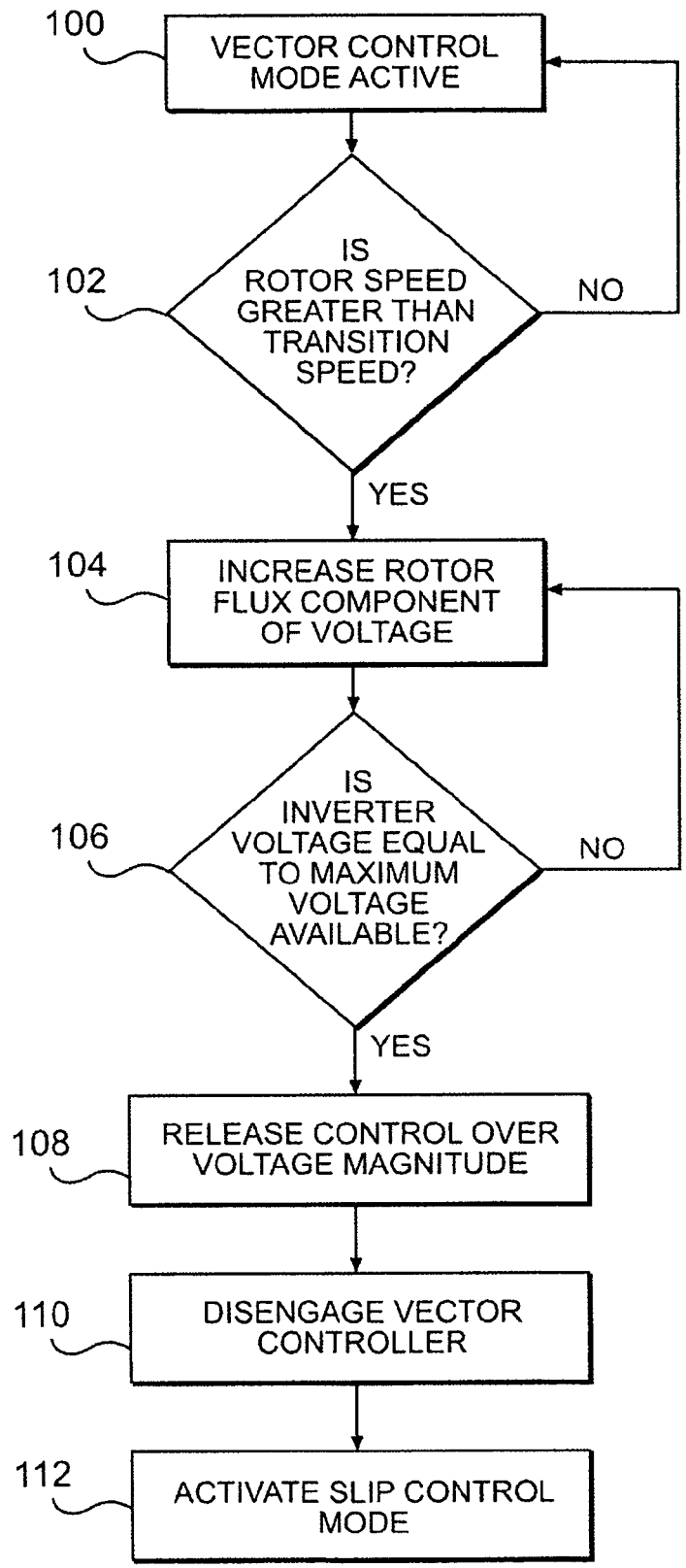
FIG. 5 is a flow diagram of a method, according to an exemplary disclosed embodiment.

FIG. 5 illustrates a flow diagram depicting an exemplary method of transitioning from vector control to slip control. The method may begin when control unit 44 is operating in vector control mode (step 100). A determination may be made as to whether the rotor speed of driven device 22 is greater than a predetermined transition speed (step 102). The transition speed may relate to the maximum voltage at which control unit 44 may adequately control driven device 22 in vector control mode and may depend on the size of the motor.

The determination of step 102 may be made by analyzing data sensed by sensors located on or near driven device 22. Such data may be indicative of the rotor speed of driven device 22. The sensed rotor speed may be compared with tables, graphs, and/or equations stored in the memory of either controller 24 or control unit 44. Alternatively, the determination of step 102 may be made by analyzing the magnitude of the voltage called for by vector controller 52. The magnitude of the voltage may be compared to a preset voltage limit stored inside the memory of controller 24, control unit 44, or vector controller 52. The preset voltage limit may be indicative of the transition speed.

If the rotor speed of driven device 22 is less than the predetermined transition speed, or the magnitude of the voltage called for by vector controller 52 is less than the preset voltage limit (step 102: No), then control unit 44 may continue to operate in vector control mode. However, if the rotor speed of driven device 22 is greater than the predetermined transition speed, or the magnitude of the voltage called for by vector controller 52 is greater than the preset voltage limit (step 102: Yes), then controller 24 may send a command to control unit 44 to begin the transition process.

The maximum voltage used in vector control mode may not be the maximum voltage available to the system. However, under slip control mode, the system may operate at the maximum voltage available. During transition, the differential in voltage may need to be traversed without losing control of the speed and torque of the motor. This may be accomplished by increasing the rotor flux component of the voltage while maintaining the torque component at an essentially constant level. Increasing the rotor flux component of the voltage while maintaining the torque component at essentially the same level may allow the overall magnitude of the voltage to increase to a level at or near the maximum available voltage with little or no loss of speed and torque control. Upon beginning the transition process, inverter 20 may be commanded to increase the rotor flux component of the voltage while maintaining the torque component at an essentially constant level (step 104). This command may come from controller 24, control unit 44, or vector controller 52.

Next, a determination may be made as to whether the magnitude of the inverter voltage has reached the maximum level available (step 106). The determination may be made by comparing the magnitude of the voltage to reference tables stored in the memory of inverter 20, controller 24, control unit 44, or vector controller 52. If the magnitude of the voltage has not reached the maximum level available (step 106: No), then the inverter may continue to increase the rotor flux component of the voltage. However, if the magnitude of the voltage has reached the maximum level available (step 106: Yes), then the transition from vector control mode to slip control mode may be completed.

Upon reaching the maximum voltage level, control over the magnitude of the voltage may be released (Step 108), vector controller 52 may be disengaged (step 110), and slip control mode may be activated (112). Control unit 44 may operate in slip control mode so long as the motor speed remains above the predetermined transition speed mentioned above.

Figure 6:
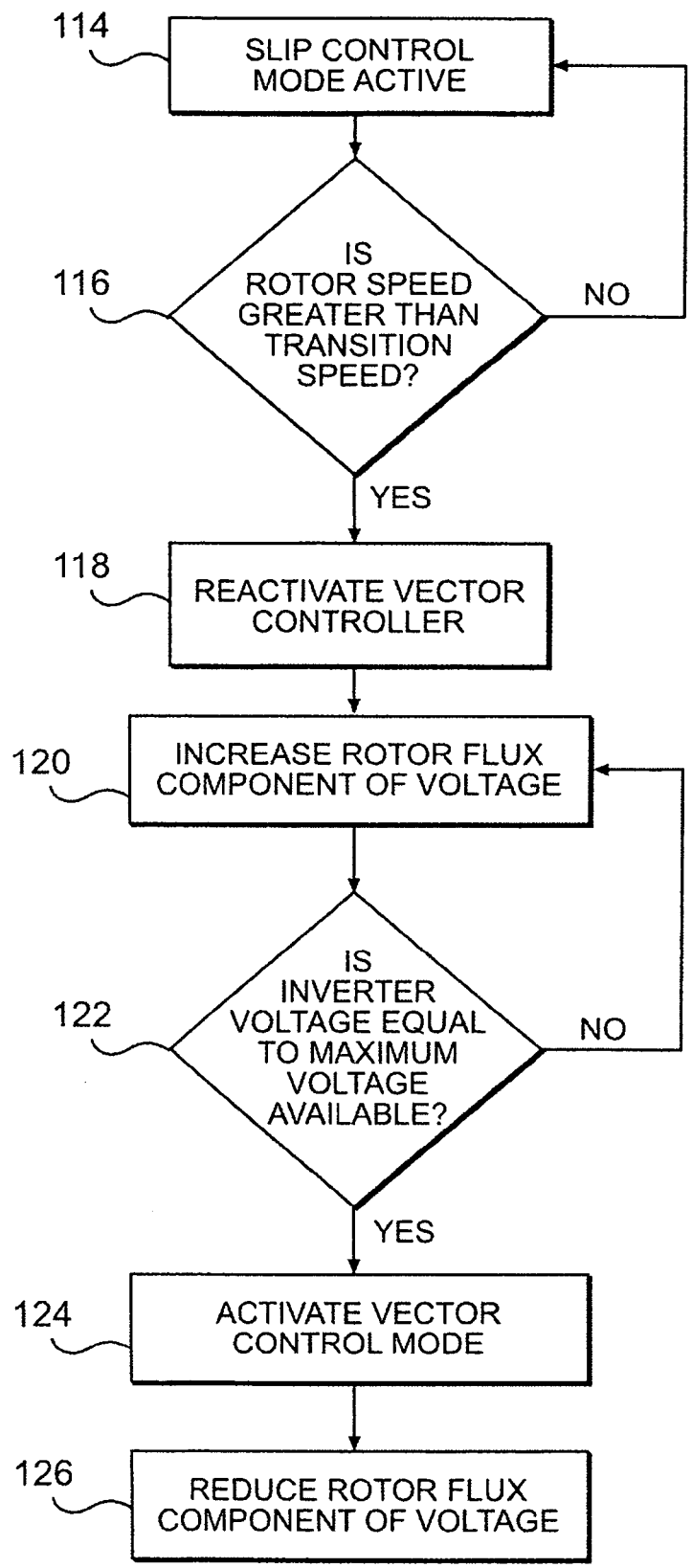
FIG. 6 is a flow diagram of a method, according to an exemplary disclosed embodiment.

FIG. 6 illustrates a flow diagram depicting an exemplary method of transitioning from slip control to vector control. The method may begin when control unit 44 is operating in slip control mode (step 114). A determination may be made as to whether the rotor speed of driven device 22 is less than a predetermined transition speed (step 116). The transition speed may be the same transition speed referenced in step 102.

Similarly to step 102, the determination of step 116 may be made by analyzing data sensed by sensors located on or near driven device 22. Such data may be indicative of the rotor speed of driven device 22. The sensed rotor speed may be compared with tables, graphs, and/or equations stored in the memory of either controller 24 or control unit 44. If the rotor speed of driven device 22 is greater than the predetermined transition speed, (step 116: No), then control unit 44 may continue to operate in slip control mode. However, if the rotor speed of driven device 22 is less than the predetermined transition speed, (step 116: Yes), then controller 24 may send a command to control unit 44 to begin the transition process.

Upon beginning the transition process, vector controller 52 may be reactivated (step 118), and inverter 20 may be commanded to increase the rotor flux component of the voltage while maintaining the torque component at an essentially constant level (step 120). Similar to the command in step 104, the command of step 120 may come from controller 24, control unit 44, or vector controller 52. Next, a determination may be made as to whether the magnitude of the inverter voltage is at the maximum level available (step 122). The determination may be made by comparing the magnitude of the voltage to reference tables stored in the memory of inverter 20, controller 24, control unit 44, or vector controller 52. If the magnitude of the voltage has not reached the maximum level available (step 122: No), then the inverter may continue to increase the rotor flux component of the voltage. However, if the magnitude of the voltage has reached the maximum level available (step 122: Yes), then the transition from slip control mode to vector control mode may be completed.

Upon reaching the maximum voltage level, vector control mode may be activated (step 124), and the rotor flux component of the voltage may be brought to a more conventional level for adequate control of the motor under vector control (step 126). Control unit 44 may operate in vector control mode so long as the motor speed remains below the predetermined transition speed mentioned above.

By increasing the rotor flux component of the voltage and maintaining the torque component at an essentially constant level during the transition between slip control and vector control, controller 24 may be able to maintain control over the speed and torque of driven device 22 during the transition. This may allow controller 24 to adequately control driven device 22 at all possible speeds.

Maintaining control over the speed and torque of driven device 22 may reduce the possibility of experiencing overcurrent, undercurrent, overvoltage, and heat generation during the transition between vector control and slip control. Furthermore, maintaining control over the speed and torque of driven device 22 may reduce the possibility of the sensitive electronic equipment of controller 24 or inverter 20 from being damaged. Damage to driven device 22 and any apparatus being driven by driven device 22 may also be reduced or prevented.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A system for controlling an electric machine comprising:
   a power source configured to supply electric energy to the electric machine;
   an inverter operationally connected to the power source and the electric machine and configured to increase or decrease a rotor flux component of a voltage applied to the electric machine while maintaining a torque component of the voltage at an essentially constant level; and
   a control device configured to determine at least one parameter of the electric machine and operate the inverter in a first mode and a second mode depending on a value of the at least one determined parameter, wherein the first mode is a vector control mode and the second mode is a slip control mode.

2. The system of claim 1, wherein the control device is configured to cause the inverter to increase the applied voltage to a maximum available level when the inverter is operating in the first mode and the applied voltage is above a predetermined threshold.

3. The system of claim 2, wherein the control device is configured to cause the inverter to increase the rotor flux component of the applied voltage when the inverter is operating in the first mode and the applied voltage is above a predetermined threshold.

4. The system of claim 1, wherein the at least one determined parameter is indicative of rotor speed.

5. The system of claim 4, wherein the control device is configured to cause the inverter to increase the applied voltage to a maximum available level when the inverter is operating in the first mode and the rotor speed is above a predetermined threshold speed.

6. The system of claim 5, wherein the control device is configured to cause the inverter to increase the rotor flux component of the applied voltage when the inverter is operating in the first mode and the rotor speed is above a predetermined threshold speed.

7. The system of claim 4, wherein the control device is configured to cause the inverter to increase the applied voltage to a maximum available level when the inverter is operating in the second mode and the rotor speed is below a predetermined threshold speed.

8. The system of claim 7, wherein the control device is configured to cause the inverter to increase the rotor flux component of the applied voltage when the inverter is operating in the second mode and the rotor speed is below a predetermined threshold speed.

9. A method for controlling an electric machine comprising:
applying a voltage to a current passing through the electric machine; and
increasing a rotor flux component of the voltage while maintaining a torque component of the voltage at an essentially constant level during a transition from a first control mode to a second control mode when the machine is operating in the first control mode and a parameter of the machine increases above a predetermined threshold for the parameter; and
increasing the rotor flux component of the voltage while maintaining the torque component of the voltage at an essentially constant level during a transition from the second control mode to the first control mode when the machine is operating in the second control mode and the parameter of the machine decreases below the predetermined threshold for the parameter.

10. The method of claim 9, wherein the parameter of the machine is indicative of a machine speed.

11. The method of claim 10, wherein increasing the rotor flux component of the voltage during the transition from the first control mode to the second control mode further includes increasing the rotor flux component of the voltage until the voltage is at a maximum available level.

12. The method of claim 9, wherein increasing the rotor flux component of the voltage during the transition from the first control mode to the second control mode further includes increasing the rotor flux component of the voltage until the voltage is at a maximum available level.

13. The method of claim 9, wherein increasing the rotor flux component of the voltage during the transition from the second control mode to the first control mode further includes increasing the rotor flux component of the voltage until the voltage is at a maximum available level.

14. The method of claim 13, further including:
decreasing the rotor flux component of the voltage after the voltage has reached a maximum available level.

15. A machine comprising:
at least one traction device;
a power source configured to generate a power output; and
an electric drive configured to receive the power output and drive the at least one traction device, the electric drive having:
a generator;
an electric motor powered by the generator;
an inverter operationally connected to the generator and the electric motor and configured to increase or decrease a rotor flux component of a voltage applied to the electric motor while maintaining the torque component of the applied voltage at an essentially constant level; and
a controller configured to determine at least one parameter indicative of a rotor speed or applied voltage of the electric motor and operate the inverter in a first mode and a second mode depending on a value of the at least one determined parameter, wherein the first mode is a vector control mode and the second mode is a slip control mode.

16. The machine of claim 15, wherein the control device is configured to cause the inverter to increase the rotor flux component of the applied voltage so that the applied voltage reaches a maximum available level when the inverter is operating in the first mode and the applied voltage is above a predetermined threshold.

17. The machine of claim 15, wherein the control device is configured to cause the inverter to increase the rotor flux component of the applied voltage so that the applied voltage reaches a maximum available level when the inverter is operating in the first mode and the rotor speed is above a predetermined threshold speed.

18. The machine of claim 15, wherein the control device is configured to cause the inverter to increase the rotor flux component of the applied voltage so that the applied voltage reaches a maximum available level when the inverter is operating in the second mode and the rotor speed is below a predetermined threshold speed.

* * * * *